(12) United States Patent
Mancuzo et al.

(10) Patent No.: US 12,240,118 B2
(45) Date of Patent: Mar. 4, 2025

(54) FORCE AMPLIFICATION MOBILE ROBOTIC SYSTEM (EXOBOT)

(71) Applicants: Petróleo Brasileiro S.A.—Petrobras, Rio de Janeiro (BR); INSTITUTO TECNOLÓGICO DE AERONÁUTICA—ITA, São José dos Campos (BR)

(72) Inventors: Mechelangelo Viana Mancuzo, São José dos Campos (BR); Luís Gonzaga Trabasso, São José dos Campos (BR); Wilson Da Cunha Lara, Jr., Caçapava (BR); Carlos Cesar Aparecido Eguti, São José dos Campos (BR); Wesley Rodrigues Oliveira, Jacareí (BR); Ulisses Haber Canuto, São José dos Campos (BR)

(73) Assignees: Petróleo Brasileiro S.A.—Petrobras, Rio de Janeiro (BR); INSTITUTO TECNOLÓGICO DE AERONÁUTICA—ITA, São José dos Campos (BR)

( * ) Notice: Subject to any disclaimer, the term of this patent is extended or adjusted under 35 U.S.C. 154(b) by 326 days.

(21) Appl. No.: 17/850,469

(22) Filed: Jun. 27, 2022

(65) Prior Publication Data
US 2022/0410387 A1 Dec. 29, 2022

(30) Foreign Application Priority Data
Jun. 25, 2021 (BR) ...................... 10 2021 012724 4

(51) Int. Cl.
*B25J 9/16* (2006.01)

(52) U.S. Cl.
CPC ............. *B25J 9/1633* (2013.01); *B25J 9/162* (2013.01); *B25J 9/1664* (2013.01); *B25J 9/1679* (2013.01); *B25J 9/1697* (2013.01)

(58) Field of Classification Search
None
See application file for complete search history.

(56) References Cited

U.S. PATENT DOCUMENTS 4,412,775 A * 11/1983 Molitor ................. B66C 1/0212
                                                           414/626
6,535,793 B2    3/2003 Allard
                       (Continued)

FOREIGN PATENT DOCUMENTS

CN          105904432 A      8/2016

*Primary Examiner* — Michael S Lowe
(74) *Attorney, Agent, or Firm* — Mintz, Levin, Cohn, Ferris, Glovsky and Popeo, P.C.

(57) ABSTRACT

The present invention proposes a mobile robotic system capable of carrying out the movement, manipulation and precise installation of industrial loads (pipes, plates, equipment, parts, materials, etc.), using a single operator for that and presenting ease of use. The invention is basically composed of an anthropomorphic-type industrial robot (3) and a crawler mobile platform (11). The load capacity of the invention is limited by the maximum load capacity of the industrial robot employed. The precise positioning step has a special force amplification system (external exoskeleton) capable of moving a load fixed on the industrial robot wrist (position and orientation) with the force actions of an operator, directly on the robot wrist, or by means of a security extension. The robotic system can be controlled by radio control, capable of allowing both the control of the robot and the movement of the platform.
The proposed system of this invention comprises a mobile platform for all types of terrain, an industrial robotic arm, an effector for handling pipes, an effector to pick up metal (Continued)

plates, the respective supports of effectors in a quick tool change system, a diesel electric generator, an industrial radio control, safety sensors and a video monitor for two cameras positioned on the robot structure.

5 Claims, 3 Drawing Sheets

(56) References Cited

U.S. PATENT DOCUMENTS

| | | | |
|---|---|---|---|
| 9,789,603 B2* | 10/2017 | Jacobsen | B25J 13/025 |
| 9,950,907 B2* | 4/2018 | Moore | B66C 1/66 |
| 10,375,290 B2* | 8/2019 | Webster | H04N 23/69 |
| 10,793,047 B1 | 10/2020 | Theobald | |
| 10,814,484 B2* | 10/2020 | Preisinger | G05B 19/423 |
| 11,192,243 B2* | 12/2021 | Nilsson | B25J 15/0019 |

\* cited by examiner

FORCE AMPLIFICATION MOBILE ROBOTIC SYSTEM (EXOBOT)

CROSS-REFERENCE TO RELATED APPLICATION

This application claims priority to Brazilian Application No. 10 2021 012724 4, filed on Jun. 25, 2021, and entitled "FORCE AMPLIFICATION MOBILE ROBOTIC SYSTEM (EXOBOT)," the disclosure of which is incorporated herein by reference in its entirety.

FIELD OF THE INVENTION

The present invention is based on the development of a system for moving and positioning loads with a mass of up to 400 kg.

The proposed system can be used in remote environments, acting remotely.

DESCRIPTION OF THE STATE OF THE ART

The movement and positioning of high mass parts, outside human physical limits (typically above 50 kg) are routine tasks at construction sites and similar places that require the constant use of cranes, trucks with Munck system, or hoists anchored or supported on the ground. The anchoring features of these pieces of equipment restrict the movement of the load to the region within its range of action, thus not allowing its movement outside this region. In addition, the precise positioning of the load is limited to the skill of operating the controls of said crane by the respective operator, who often needs external support (the assistance from another operator) to indicate the proper definitive or temporary storage location of the load.

Cranes have a greater radius of action when compared to hydraulic truck cranes, known as Munck system. However, its height and high dimensions restrict its use in outdoor applications. Some mobile cranes also require prepared access and movement paths, since their high mass, presence of metal tracks and counterweights, require flat, leveled and mud-free terrain.

In many situations of the daily life of a work, it is necessary to carry out the unloading of equipment and materials in temporary storage places. Once this is done, such equipment or materials must be transported to the definitive place of installation or use. This sequence of procedures generally makes use of a truck with a Munck system and a crane, which require specialized teams for each of these means.

Cargo moving logistics also require specialized, trained and certified operators to control each of the pieces of equipment involved; however, the biggest difficulty is in the precise positioning of the part, equipment or materials, in the definitive places of its installation. Operator expertise is critical to performing these operations safely and quickly.

According to Regulatory Standard 17 (Art. 17.2.2 of NR17), workers are not allowed to carry out manual transport of loads whose weight is likely to compromise their health or safety. In this way, in construction sites, constructions or in any industrial environment that have short-distance transport processes of parts with a mass close to or above human capacity, it is necessary to use different vehicles to carry out the transport, lifting and installation of equipment or loads. For each different type of transport or cargo moving equipment, its respective operator is required, duly trained and certified to perform the proper operation.

Document U.S. Pat. No. 6,535,793B2 discloses methods for remotely controlling a mobile robot and an intuitive user interface for remotely controlling the robot. According to document U.S. Pat. No. 6,535,793,B2, communication between the computer and the robot can be done via radio. To assist the user, a robot integrated camera is used, generating an image of objects of interest around the robot. Despite presenting a remotely controlled robot, this one, however, is not capable of transporting or handling loads with considerable weight.

Document CN105904432A discloses an industrial tube stacking robot. The robot includes a displacement device, an adjustable support, a rotating device, a three-degree-freedom parallel mechanism, and a clamping device. The industrial robot of document CN105904432A can perform a number of operations, including picking up, transporting and stacking tubes, such as those for water conservation and hydroelectric power. Despite presenting a robot capable of carrying and handling loads, the robot in document CN105904432A, however, is only able to work with tubes, thus limiting its versatility.

Document U.S. Pat. No. 10,793,047,B1 discloses a mobile robot with a bearing surface for supporting a plurality of goods and fixing materials. A robotic arm is attached to the robot and configured to autonomously pick up the goods from a remote location of the mobile robot, placing them in the desired positions on a support surface, and autonomously fixing them. Despite presenting a remotely controlled robot and having a robotic arm, the robot of document U.S. Pat. No. 10,793,047,B1, however, is not capable of transporting or handling loads with considerable weights.

In view of the challenges presented in the State of the Art for solutions for moving and handling loads of considerable weight and, in view of documents with similar solutions, but which do not present the unique features of the invention, this document presents in detail all the points with potential innovation of said invention.

OBJECTIVE OF THE INVENTION

The present invention generates a time saving in the execution of different operations of handling and transporting loads, reducing the use of machines allocated in the field, thus increasing the safety of the operators and, consequently, the global economy in the execution of a field work or job, mainly outdoors.

It is also an objective of the invention to reduce the work team, which can be of a single operator, thus reducing the risk of accidents in mobilized personnel, contributing to increase the levels of work safety, directly meeting NR 11 (Transport, Moving, Storage and Handling of Materials), NR 17 (Ergonomics), among others.

BRIEF DESCRIPTION OF THE INVENTION

In order to achieve the objectives described above, the present invention proposes and presents a system capable of carrying out transporting over small distances, handling and precise installation of loads (pipes, plates, equipment, parts, materials etc.), using for that a reduced team of operators and presenting easiness in its use. The precise positioning step has a special force amplification system capable of moving the load (position and orientation) manually, without the need for special controls (like levers, buttons, joysticks or valves). A robotic system is fixed on a mobile platform and thus performs the function of an external exoskeleton, capable of allowing the movement of the load by the same operator responsible for the transport or installation.

BRIEF DESCRIPTION OF DRAWINGS

The present invention will be described in more detail below, with reference to the attached figures which, in a schematic form and not limiting the inventive scope, represent examples of its embodiments.

DETAILED DESCRIPTION OF THE INVENTION

There follows below a detailed description of an embodiment of the present invention, of an exemplary nature and in no way limiting. Nevertheless, there will become clear to a technician skilled on the subject, from reading this description, the possible additional embodiments and variations of the present invention further comprised by the essential and optional features below.

The present invention can be used in different assembly processes (static equipment), pipelines, spheres for gas storage, construction and maintenance of refineries, tank cleaning processes, positioning of loads with precision, handling of plates for welding, temporary storage of parts and others. Its use can be both civil and military, and can act in other industrial branches, such as the nuclear, naval, railway, subway, road industry to move by means of the movement of parts and equipment directly by the action and command of an operator.

The system of this invention acts as an external exoskeleton, where an anthropomorphic industrial robot with 6 degrees of freedom supports a load of up to 400 kg, which is moved by the action of an operator, directly on the load, without the need for programming, using a remote control or a robot operator interface. Thus, its use for the movement of materials is very wide, and it is enough to carry out the correct fixation of the load in a respective effector. It is up to the operator to perform movements of pulling, pushing and rotating the load so that the robot performs, in a synchronized way, the respective movements in the directions imposed by the operator. No prior knowledge of robot programming is required by the operator. The load can be placed in any position and orientation, within the robot range of action, remaining stationary in its last position and orientation, when no external force acts on the load.

Figure 1:
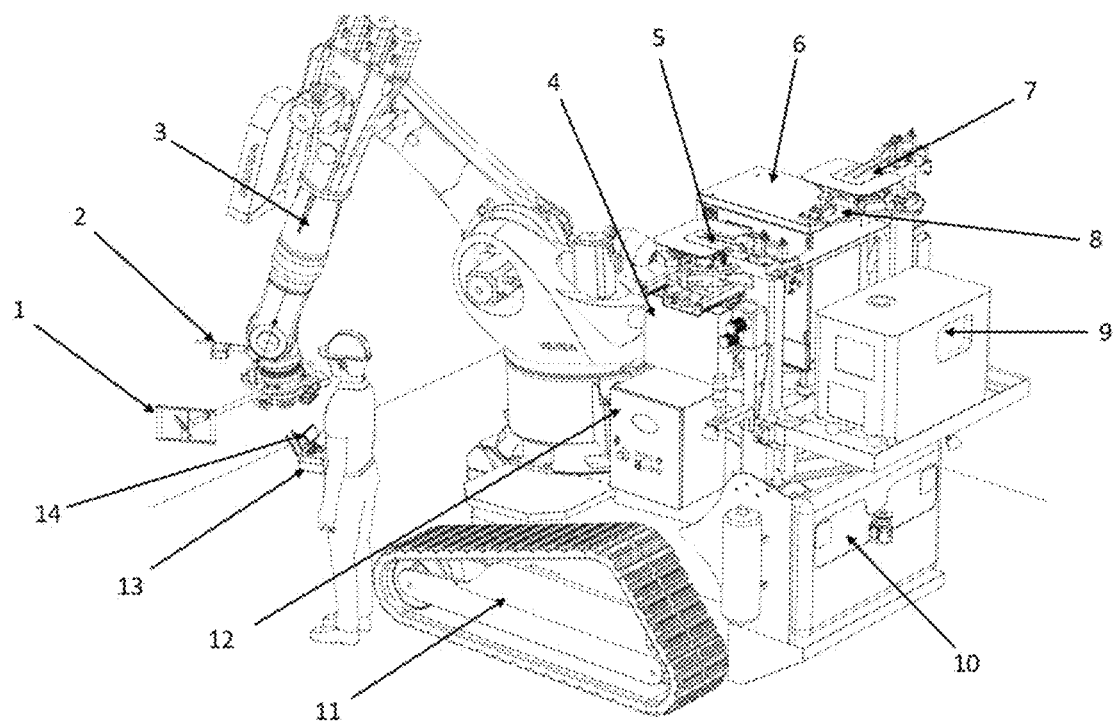
FIG. 1 is a back perspective view of an embodiment of a mobile robotic system.

In FIG. 1 the following items are represented: Guiding Device (1), Video Camera A (2), Industrial Robot (3), Gripper Effector (4), Gripper Effector Support (5), Robot Control Cabinet (6), Plate Gripper Effector Support (7), Plate Gripper Effector (8), Power Generator (9), Crawler Mobile Platform Motor Access (10), Crawler Mobile Platform (11), General Control Cabinet (12), System Remote Control (13), Video Monitor for Cameras A and B (14).

Figure 2:
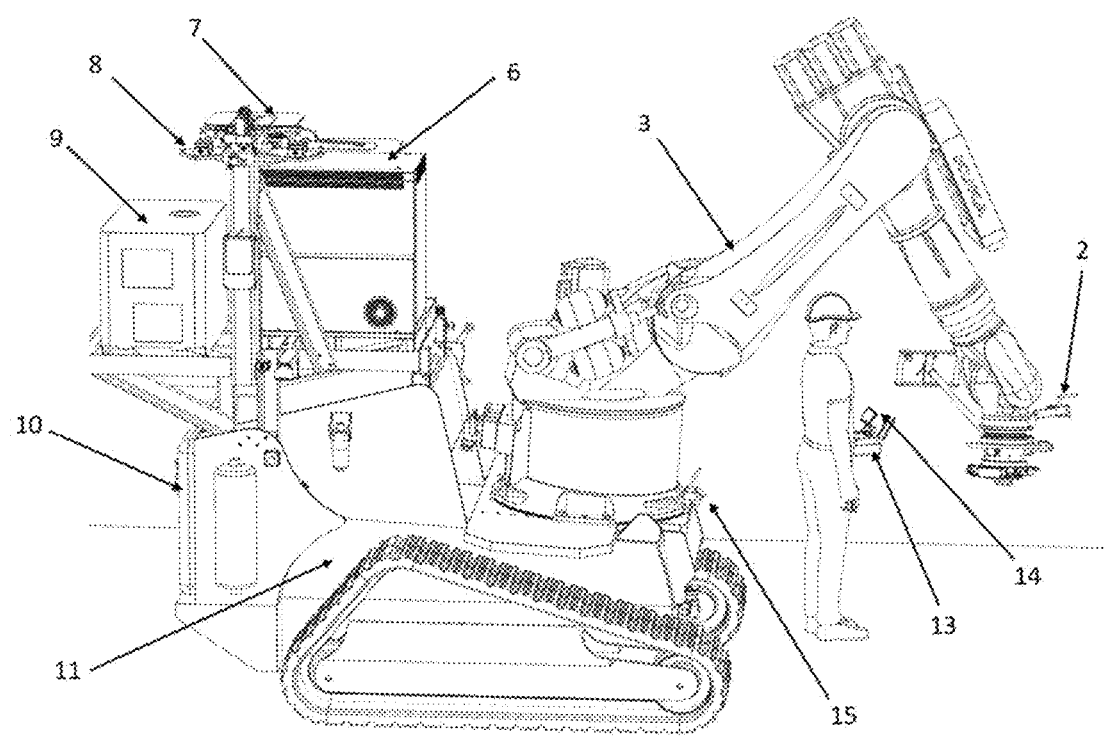
FIG. 2 is a side view of the mobile robotic system of FIG. 1.

In FIG. 2, another view of the invention, the following items are represented, some repeated from FIG. 1: Video Camera A (2), Industrial Robot (3), Robot Control Cabinet (6), Plate Gripper Effector Support (7), Plate Gripper Effector (8), Power Generator (9), Crawler Mobile Platform Motor Access (10), Crawler Mobile Platform (11), System Remote Control (13), Video monitor of cameras A and B (14), Video camera B (15).

According to FIGS. 1 and 2, the mobile robotic system of force amplification is formed by a crawler mobile platform (11), with locomotion capacity in any terrain, wherein it receives an anthropomorphic industrial robot with six degrees of freedom (3), totaling eight degrees of freedom considering the movement of the mobile platform. The structure of the mobile platform (11) further has the function of supporting all other equipment, such as: the Gripper effector (4), the Plate Gripper Effector (8), the supports of other effectors (5) and (7), the electrical power generator (9), the robot control cabinet (6), an air compressor, a hydraulic unit (not visible) and other equipment and sensors.

In order to increase the safety of moving the load, an extra guiding device (1) can be added to the exoskeleton system, to allow the operator to manipulate the load at a distance of 1.0 m from its respective perpendicular shadow. This ensures that, in the event of a failure in the fastening system, the fall of the load does not hit the operator, especially his lower limbs, such as feet and legs. This guiding device (1) consists of a 1.0 m long aluminum tube (22) with a control wheel (23). The pulling, pushing and rotating actions of the load can be applied to this wheel (23), without prejudice to the system exoskeleton capacity.

Load fixing depends exclusively on the type of effector used (also referred to as tool or gripper). To allow the exchange between different types of effectors, the robot is equipped with a tool changer (19), shown in FIG. 3, for industrial use, formed by a master coupler (master), fixed to the robot wrist (3), and other slave couplers (tools), each one properly fixed to the effectors.

The present invention uses two types of effectors, one being exclusive for handling pipes (called Gripper) (4) and another for steel plates (Plate Gripper) (8). However, the invention is not limited only to pipes and plates, since it is possible to use different types of effectors, for which it is necessary to install a slave coupler in this new effector.

Tool changers can be of any type and model, as long as they meet the requirements of load, moment of inertia and fast exchange of signals between the robot and the tool. The tool change operation uses compressed air to open, close and lock the master coupler on the slave. Due to this, but not limited to the use of compressed air, the invention uses an air compressor to provide this source of energy (not visible, as it is installed inside the mobile platform). Other models of tool changers can be used in the invention, which can be electrical, mechanical or hydraulic in nature.

The system is not limited to the use of a crawler mobile platform (11), but can be a mobile platform with wheels of any material, metallic or rubber crawler, use on rails or any locomotion system for industrial use and for any type of terrain (asphalt, earth, mud, snow, grass, concrete, etc.), as long as it has the capacity to support the robot mass, the respective load of up to 400 kg, the changers and effectors. The energy source of the mobile platform (10) is not limited to the use of diesel engines, and may be based on gasoline, alcohol, natural gas, LPG (Liquefied Petroleum Gas) or electric, by means of battery banks of any type, in addition to fuel cells or turbines.

The electric power generator (9) is not limited to the use of diesel; it can be a gasoline, alcohol or any other type of fuel generator, provided that it performs the function of a generator. This equipment can still be installed together with the motor of the mobile platform (10), taking advantage of part of the motor energy of the platform motor.

The robot control cabinet (6) can be unified with the general control cabinet of the invention (12), thus having a single cabinet to house all the electrical and electronic equipment of the invention.

In order to assist the operator in conditions of difficult access, the system has two video cameras (2) and (15) with the purpose of sending the images in real time to a portable monitor (14), fixed next to the system remote control (13), which is attached to the operator's waist by means of a belt. This system does not hinder the movement of the operator's arms, leaving them free for other operations.

The invention is limited to loads of up to 400 kg due to the operational limitations of the used industrial robot (3). Since there is a wide range of load capacity (payload) for industrial robots available on the market, the invention can work with larger or smaller loads, as long as another robot is used.

Figure 3:
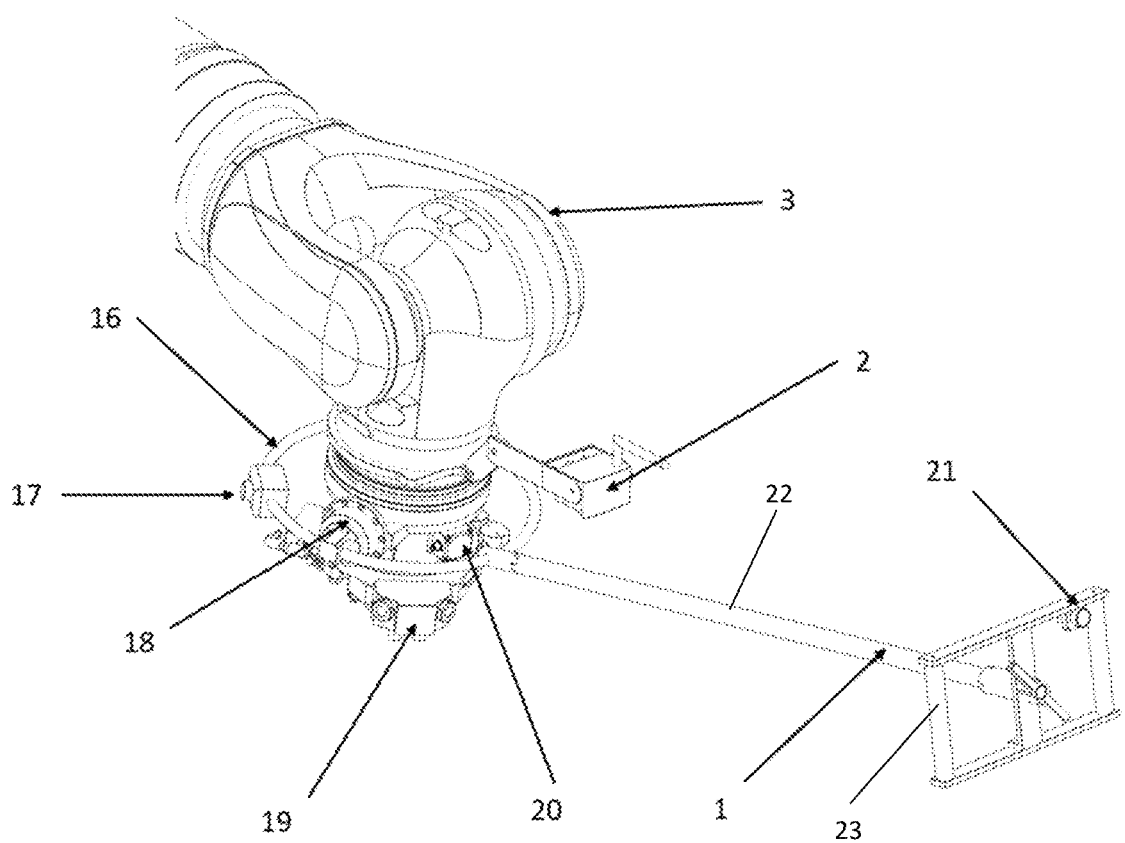
FIG. 3 is a magnified view of a portion of the mobile robotic system of FIG. 1.

The invention makes use of two load cells (18) and (20), with different operational limits, as shown in FIG. 3. The higher capacity load cell (20) is intended to monitor the load on the effector and detect load collision, with usage range compatible with the robot capacity (400 kg). The lower capacity load cell (18) is used in the exoskeleton control cycle, fixed to the guiding ring (16), as shown in FIG. 3. The latter is responsible for measuring the operator's force and torque actions (pulling, pushing and turning) and transmit the same to the robot (3) in a real-time control cycle, thus realizing the main function of this invention. The guiding ring (16) can be operated directly with the operator's hand or indirectly with the remote guiding tool (1). Activation buttons (17) and (21), both shown in FIG. 3, act as a safety button, releasing the robot movements only when they are pressed. This prevents the robot from making any unwanted movements if the operator drops the load or the wheel (23).

The exoskeleton function of the invention (or assisted operation) is implemented in a real-time algorithm executed in an industrial computer, installed inside the general control cabinet (12). This program interprets the signals from the load cell (18) and performs the respective movement of the industrial robot (3). The industrial computer used represents a high-performance, high-reliability and fail-safe embedded system.

The industrial robot (3) can also be controlled by means of a remote control (13), which is an alternative movement when the load is out of the reach of the operator. In certain positions, the robot wrist can reach a height of 5.5 m, thus requiring the use of the remote control (13) to place the wrist and, consequently, the effector with the load, at a suitable height for operator-assisted operation. This remote control is also responsible for moving the mobile platform (11), since there is no cabin or manual movement controls. These movement functions using the remote control (13), both of the robot (3) and the mobile platform (11), are implemented in the control cycle of the industrial computer.

The invention claimed is:

1. A force amplification mobile robotic system comprising:
    a mobile platform with capacity for displacement in different types of terrain;
    a tool changer;
    force transducers;
    video cameras;
    an industrial robot;
    an effector for pipes;
    an effector for plates,
    support of effectors;
    a power generator;
    an air compressor;
    a real-time industrial computer;
    a guiding ring coupled to at least one of the force transducers, the at least one of the force transducers being coupled to a wrist of the industrial robot, the industrial robot configured to move responsive to a force exerted by an operator on the guiding ring;
    a guiding tool coupled to the guiding ring, the guiding tool being configured to allow the operator to be able to move a load, supported by the industrial robot, over a safe distance of operation, the guiding tool comprising a control wheel and a tube extending between the guiding ring and the control wheel.

2. The force amplification mobile robotic system according to claim 1, wherein the industrial robot has a load capacity up to 400 kg.

3. The force amplification mobile robotic system according to claim 1, further comprising a remote control configured to control movement of the mobile platform and the industrial robot across 8 degrees of freedom.

4. The force amplification mobile robotic system according to claim 1, wherein the industrial robot has six degrees of freedom.

5. The force amplification mobile robotic system of claim 1, wherein the force transducers comprise load cells.

* * * * *